United States Patent
Noh

(10) Patent No.: US 7,486,964 B2
(45) Date of Patent: Feb. 3, 2009

(54) METHOD FOR PERFORMING ROAMING IN DUAL MODE MOBILE TERMINAL CAPABLE OF PREVENTING PING-PONG PHENOMENON

(75) Inventor: Jeong-Min Noh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 468 days.

(21) Appl. No.: 11/406,606

(22) Filed: Apr. 19, 2006

(65) Prior Publication Data
US 2006/0234710 A1      Oct. 19, 2006

(30) Foreign Application Priority Data
Apr. 19, 2005     (KR) ................ 10-2005-0032230

(51) Int. Cl.
*H04M 1/00* (2006.01)
(52) U.S. Cl. ............. 455/552.1; 455/436; 455/414.1; 455/414.2; 455/132; 370/331; 370/337
(58) Field of Classification Search ............. 455/552.1, 455/436, 414.1, 414.2, 132; 370/331, 337
See application file for complete search history.

(56) References Cited

U.S. PATENT DOCUMENTS 6,438,117 B1 * 8/2002 Grilli et al. ............. 370/331
2004/0137903 A1 * 7/2004 Park ............. 455/436
2004/0192224 A1   9/2004 Kaneko
2005/0070272 A1 * 3/2005 Marangos ............. 455/426.2
2007/0104142 A1 * 5/2007 Kim ............. 370/331

FOREIGN PATENT DOCUMENTS

| CN | 1535042 | 10/2004 |
|---|---|---|
| WO | WO 2005/034389 | 4/2005 |

* cited by examiner

*Primary Examiner*—Sanh D Phu
(74) *Attorney, Agent, or Firm*—The Farrell Law Firm, P.C.

(57) ABSTRACT

A method for performing roaming in a dual mode mobile terminal in such a manner that a ping-pong phenomenon, occurring under a weak electric field between communication networks providing communication services using different mobile communication techniques can be prevented. To this end, a communication path connected between modems performing a corresponding communication service is realized, so that roaming to a target mode can be achieved only in a case in which the intensity of a received signal measured through a target modem for the roaming has at least a predetermined threshold value. Where the intensity of the received signal has not at least the predetermined threshold value, a current mode is continuously maintained.

8 Claims, 5 Drawing Sheets

METHOD FOR PERFORMING ROAMING IN DUAL MODE MOBILE TERMINAL CAPABLE OF PREVENTING PING-PONG PHENOMENON

PRIORITY

This application claims priority under 35 U.S.C. 119 to an application entitled "Method for Performing Roaming in Dual Mode Mobile Terminal Capable of Preventing Ping-Pong Phenomenon" filed in the Korean Intellectual Property Office on Apr. 19, 2005 and assigned Serial No. 2005-32230, the contents of which are incorporated herein by reference.

BACKGROUND OF THE INVENTION

1. Field of the Invention

The present invention relates to a method for performing roaming in a dual mode mobile terminal, and more particularly to a method for performing roaming in a dual mode mobile terminal in such a manner that a ping-pong phenomenon, occurring under a weak electric field between communication networks providing communication services using different mobile communication techniques, can be prevented.

2. Description of the Related Art

Currently, a Code Division Multiple Access (CDMA) system has been already distributed over a wide area with a sufficient infrastructure. However, a third generation network such as a Wideband Code Division Multiple Access (WCDMA) network has been gradually introduced in order to provide services which cannot be supported by a second generation network such as the CDMA network. In addition, a dual mode mobile terminal designed to receive a service specialized for the third generation network in an area located in the third generation network while using the infrastructure of the second generation network has been developed.

Lately, a dual mode user equipment or a dual mode mobile terminal simultaneously supporting the WCDMA and the CDMA has been developed to satisfy the need for providing a user with a mobile terminal capable of operating using both techniques (WCDMA and CDMA). One dual mode mobile terminal utilizing the two modes requires various techniques capable of most suitably operating in two modes. Among these techniques, roaming is performed when the terminal internally switches between the WCDMA mode and the CDMA mode.

Generally, the roaming function enables a dual mode mobile terminal to perform switching between the CDMA mode and the WCDMA mode, so that the dual mode mobile terminal operating in the WCDMA mode in a WCDMA service area can switch the WCDMA mode into the CDMA mode when the dual mode mobile terminal leaves the WCDMA service area.

The roaming function in an area in which the CDMA system and the WCDMA system are installed will be described with reference to FIG. 1. FIG. 1 illustrates an area in which both a typical CDMA system and a typical WCDMA system are installed. The area, in which both a typical CDMA system and a typical WCDMA system are installed, is classified into a single CDMA area supporting only a CMDA service and a superposition area simultaneously supporting a WCDMA service as well as the CDMA service.

When a dual mode terminal 10, initially located within a WCDMA network (i.e., in the superposition area 30) and operating in the WCDMA mode leaves the WCDMA network and travels into a single CDMA network 40, the dual mode terminal 10 searches for a CDMA base station because a WCDMA base station is not available within the single CDMA network 40. Then, if the dual mode mobile terminal 10 finds the CDMA base station, the dual mode mobile terminal 10 switches from the WCDMA mode into the CDMA mode. In contrast, if the dual mode mobile terminal 10 goes into the superposition area 30 from the single CDMA area 40, the dual mode mobile terminal 10 in the CDMA mode performs the roaming function in order to switch the CDMA mode into the WCDMA mode according to a predetermined condition.

Generally, if the dual mode mobile terminal 10 operating in the WCDMA mode leaves the WCDMA service area, the dual mode mobile terminal 10 performs the roaming function to switch to the CDMA mode. Similarly, the dual mode mobile terminal 10 can determine based on system parameters received from the CDMA base station if the dual mode mobile terminal 10 is positioned at the superposition area capable of providing a WCDMA service or at an area supporting only a CDMA service. The determination may be achieved even when the dual mode mobile terminal 10 is in the CDMA mode. Accordingly, if it is determined that the dual mode mobile terminal 10 is positioned at the WCDMA superposition area 30 based on the system parameters received from the CDMA base station, the dual mode mobile terminal 10 operating in the CDMA mode performs roaming for the WCDMA mode with a predetermined time interval.

When, as shown in FIG. 1, the dual mode mobile terminal 10 moves to a position at a border 20 adjacent to the CDMA network in the WCDMA area, the dual mode mobile terminal 10 receives system parameters from the WCDMA base station in a border between the superposition area 30 and the single CDMA area 40 and performs a handover to the CDMA network 40. In other words, the dual mode mobile terminal 10 communicates with the CDMA network. However, if it is determined that signal intensity of the CDMA network in a shadow area indicated by reference numeral 50 results from a weak electric field and has at most a preset threshold value, the dual mode mobile terminal 10 performs a handover to the WCDMA network 30. However, if signal intensity received from the WCDMA network 30 has at most the preset threshold value, the dual mode mobile terminal 10 performs handover by performing the roaming toward the CDMA network 40 again. Accordingly, as the dual mode mobile terminal 10 passes through a shadow area 50, which is an area having weak CDMA receive signal intensity, a ping-pong phenomenon occurs in which a handover procedure is repeated by continuously performing the roaming function from the WCDMA network 30 to the CDMA network 40. A WCDMA weak electric field area also frequently has a ping-pong phenomenon in which the CDMA network controls the dual mode mobile terminal 10 again if the dual mode mobile terminal 10 does not perform handover toward the WCDMA network even though the dual mode mobile terminal 10 operating in the CDMA mode attempts roaming toward the WCDMA network with a predetermined time interval.

As described above for the conventional system, when a dual mode mobile terminal attempts roaming from one mode to another mode in a weak electric field area, if the one mode is not switched into another mode, the mode of the dual mode mobile terminal returns to the original mode, called a "ping-pong phenomenon".

As described above, when roaming is repeatedly performed between different networks according to the intensity of a received signal, a probability an erroneous operation of the dual mode mobile terminal may increase. In addition, when full-searching is performed to search the cells in the WCDMA, the dual mode mobile terminal remains in a system switching state during the range of 20 seconds to a maximum of 2 minutes. Accordingly, the dual mode mobile terminal does not receive services during the system switching state, thereby causing inconvenience for a user receiving the communication service.

SUMMARY OF THE INVENTION

Accordingly, the present invention has been made to solve the above-mentioned problems occurring in the prior art. An object of the present invention is to provide a method for performing roaming in a dual mode mobile terminal such that a ping-pong phenomenon, occurring under a weak electric field between communication networks providing communication services using different mobile communication techniques, can be prevented.

Another object of the present invention is to provide a method for performing roaming, in a dual mode mobile terminal such that a ping-pong phenomenon occurring when the roaming is performed between communication networks providing communication services using different mobile communication techniques is prevented, that minimizes the time required in a system switching state, thereby improving user convenience.

To accomplish the above objects, there is provided a method for performing roaming in a dual mode mobile terminal such that a ping-pong phenomenon is prevented, where the dual mode mobile terminal includes a first modem and a second modem capable of providing a service through different mobile communication schemes. The method includes determining if a current position of the dual mobile terminal is within a service superposition area based on information received from a first communication network; turning on power of the second modem after a predetermined time interval through a communication path connected between the modems if the current position is within the service superposition area; determining if the current position is within a shadow area of a second communication network by measuring the intensity of a signal received from the second modem through the communication path during a preset time interval; and maintaining a current mode if the current position is within the shadow area of the second communication network as the determination result.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
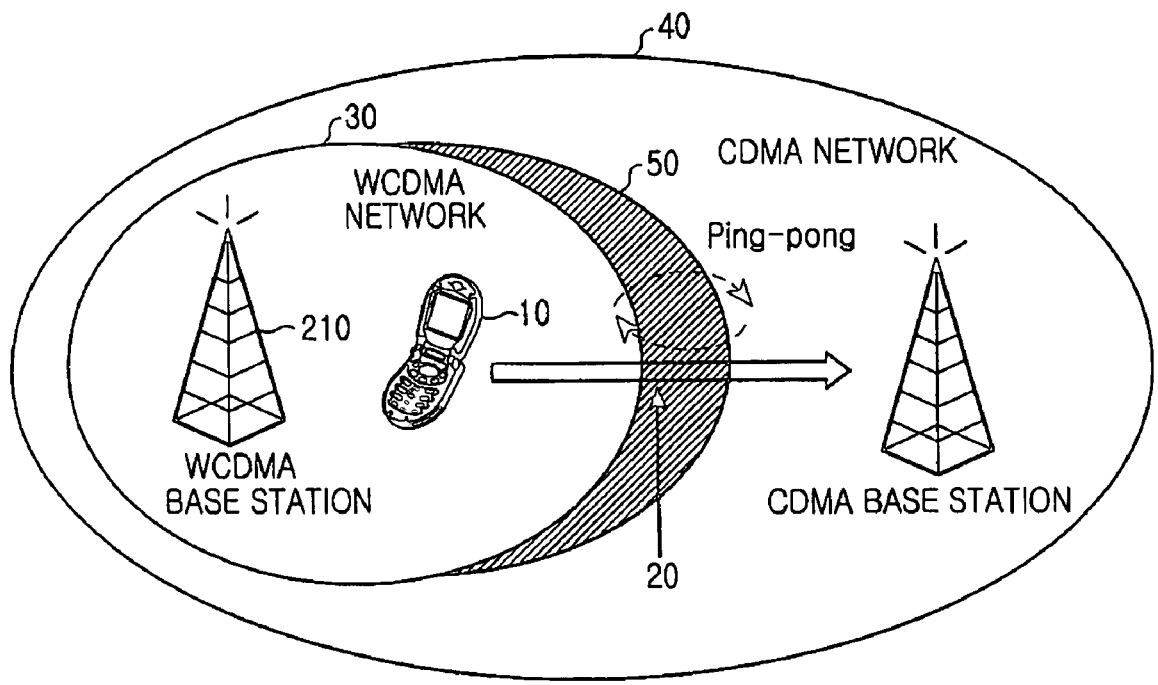
FIG. 1 illustrates an area having a typical CDMA system and a typical WCDMA system.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

According to the present invention, a function capable of preventing a ping-pong phenomenon, occurring in a weak electric field between communication networks providing communication services using different mobile communication techniques, is realized. To this end, according to the present invention, a communication path connected between modems performing a corresponding communication service is provided, so that roaming to a target mode can be achieved only in a case in which the intensity of a received signal measured through a target modem for the roaming has at least a predetermined threshold value. In contrast, in a case in which the intensity of the received signal has not at least the predetermined threshold value, a current mode is continuously maintained.

Figure 2:
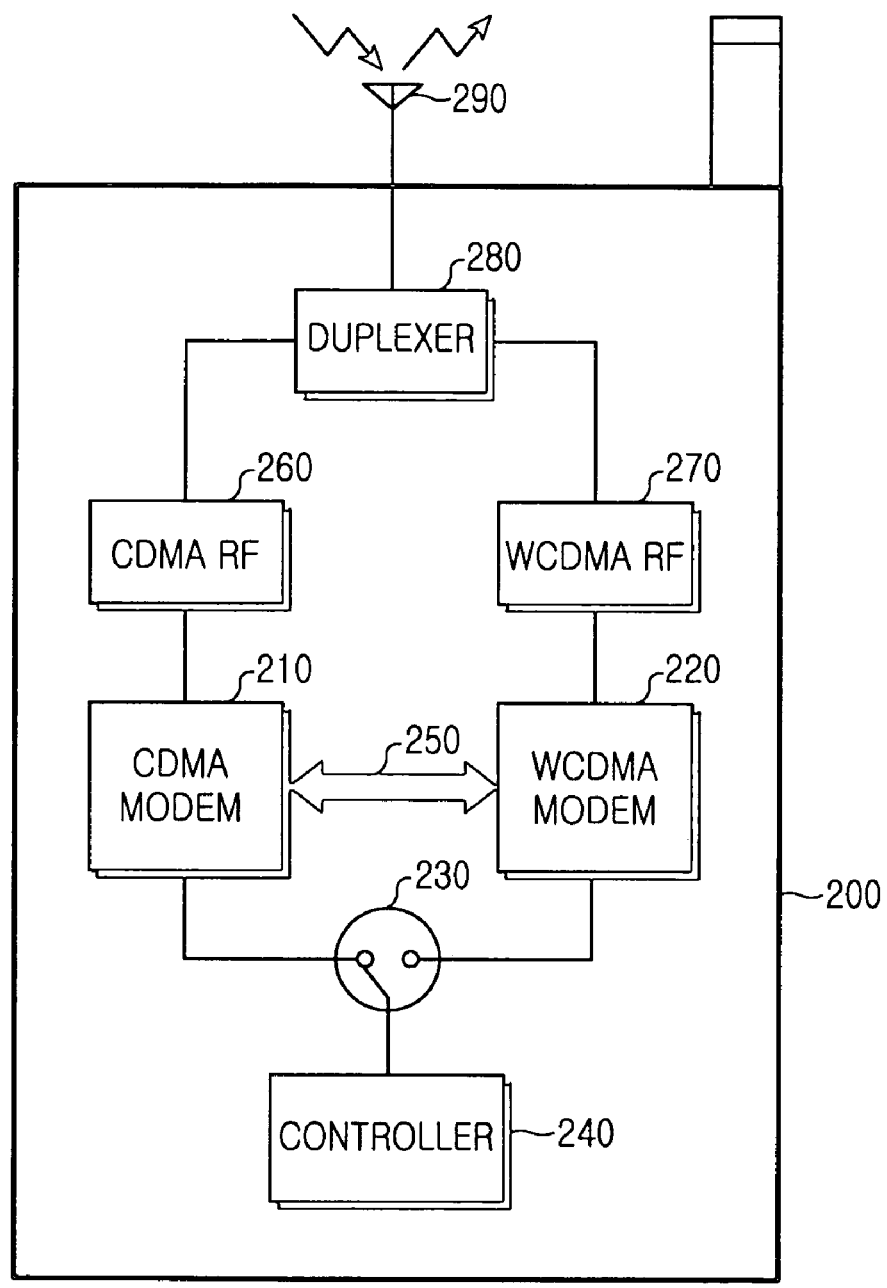
FIG. 2 is a block diagram illustrating an internal structure of a dual mode mobile terminal according to an embodiment of the present invention.

Hereinafter, the components and the operation of a dual mode mobile terminal having the realized function will be described with reference to FIG. 2. FIG. 2 is a block diagram illustrating an internal structure of the dual mode mobile terminal according to an embodiment of the present invention.

A dual mode mobile terminal 200 supporting a CDMA mode and a WCDMA mode includes a CDMA modem 210 and a WCDMA modem 220 for enabling an operation in a corresponding mode and a controller 240 controlling the CDMA modem and the WCDMA modem. The modems 210 and 220 are connected to the controller 240 through a hardware communication path. The controller 240 has a structure enabling a communication port to selectively connect to one of the CDMA modem 210 and the WCDMA 220 using a switch 230. As described above, the controller 240 has a 1:1 relationship with each of the modems 210 and 220 by means of the switch 230.

In detail, the dual mode mobile terminal 200 having the structure shown in FIG. 2 includes an antenna 290 transmitting/receiving a CDMA signal and a WCDMA signal; a duplexer 280 splitting a CDMA signal and a WCDMA signal transmitted/received through the antenna 290; RF modules 260 and 270 for processing a CDMA signal and a WCDMA signal, respectively; modems 210 and 220 processing signals transmitted to and received from the RF modules 260 and 270 through corresponding processing modules; the switch 230 used for communication between the controller 240 and each of the modems 210 and 220; and the controller 240 corresponding to a multimedia chip for processing data transmitted/received as an application processor. In particular, according to the present invention, the communication path 250 directly connected to the CDMA modem 210 and the WCDMA modem 220 is realized inside of the dual mode mobile terminal 200. In this case, the CDMA modem 210 or the WCDMA modem 220 may be a modem chip constructed in a single chip or a digital signal processor formed in the modem chip.

The structure of the dual mode mobile terminal 200 shown in FIG. 2 is an example having components required for a single antenna. Accordingly, when the terminal 200 having the above-described structure is positioned at the WCDMA network, the CDMA RF 260 and the CDMA modem 210 are temporarily powered off, and the antenna 290, the duplexer 280, the WCDMA RF 270, and the WCDMA modem 220 are powered on. In addition, since the WCDMA modem 220 is connected to the controller 240 by means of the switch 230, the terminal 200 operates in the WCDMA mode. In addition, when the terminal 200 is positioned at the CDMA network, power states are changed in opposition to the above described states and the terminal 200 operates in the CDMA mode.

In addition, the modems 240 and 250 according to the present invention continuously monitor the signal quality of a cell in a connection state after booting. In a case of the CDMA, the signal quality may be recognized based on a pilot intensity energy-to interference ratio (Ec/Io) and a receive signal strength indication (RSSI). In contrast, in a case of the WCDMA, the signal quality may be recognized based on a pilot intensity energy-to interference ratio (Ec/Io), the RSSI, and an receive signal code power (RSCP) which is a correction value of the Ec/Io and the RSSI.

Since the controller 240 has 1:1 connection relationship with one modem by means of the switch 230, an operational state of a modem which is not connected to the controller 240 cannot be recognized even though the modem is powered on. Accordingly, according to the present invention, a new communication path 250 directly connecting the CDMA modem 210 to the WCDMA modem 220 is realized in addition to the communication path between the controller 240 and each of modem 230 using the switch 230. The new communication path 250 permits detection of a state of the modem which is not connected the controller 240. The communication path 250 is realized through hardware, for example, by a serial port type. Therefore, if the communication path 250 is used, even though the dual mode mobile terminal 200 operates in the CDMA mode, the dual mode mobile terminal 200 can power on the WCDMA modem 220 in the WCDMA superposition area so as to obtain current WCDMA system information from the WCDMA modem 220 and the RSCP, which is a correction value of the WCDMA reception signal intensity.

Figure 3:
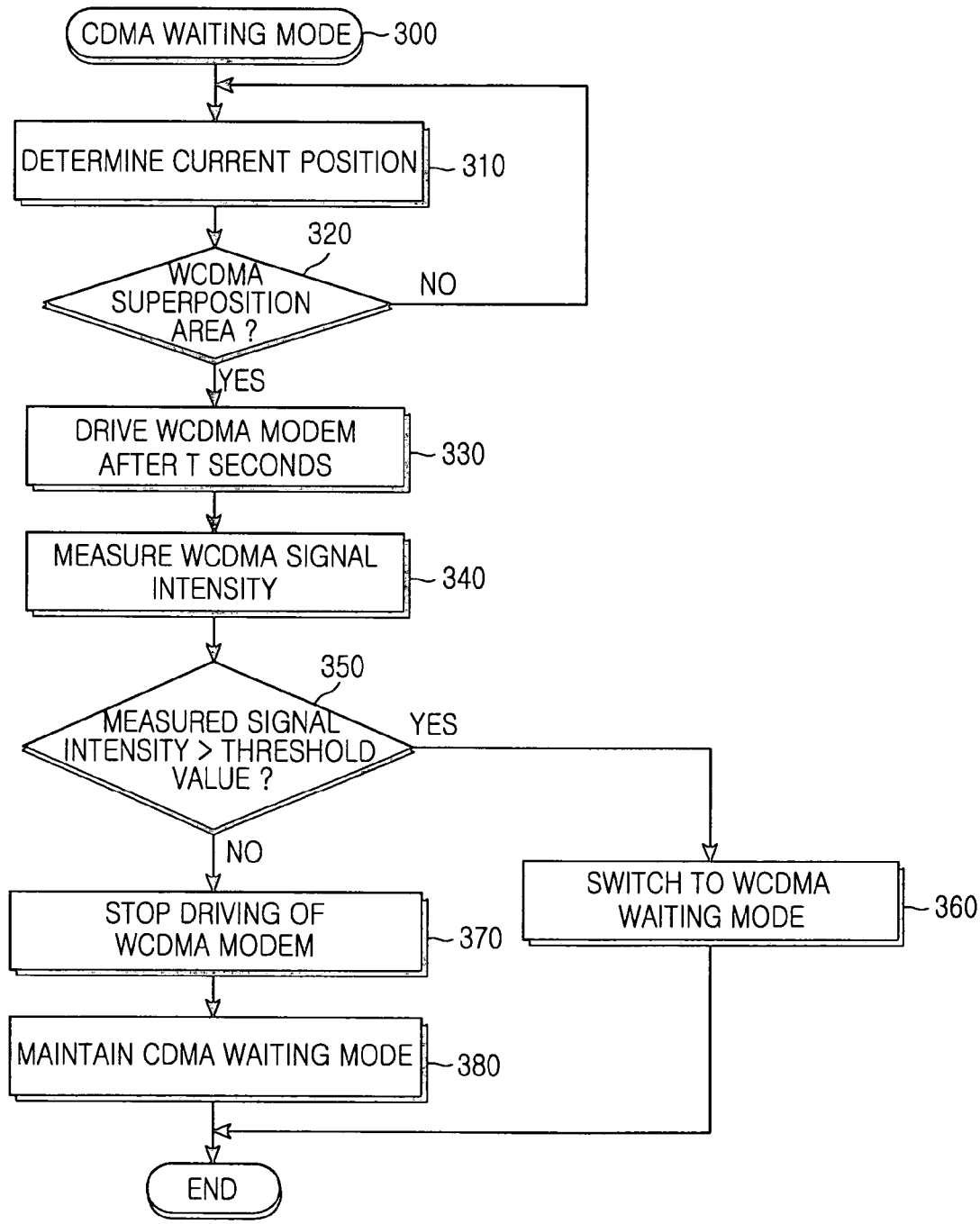
FIG. 3 is a flowchart illustrating a procedure for performing roaming by a dual mode terminal in consideration of a weak electric field, according to an embodiment of the present invention.

A detailed example according to the present invention will be described with reference to FIG. 3. FIG. 3 is a flowchart illustrating a procedure for performing roaming by dual mode mobile terminal in consideration of a weak electric field, according to an embodiment of the present invention.

If the dual mode mobile terminal employs the CDMA mode in the initial stage, the dual mode mobile terminal searches for the CDMA network and measures the RSCP of the searched signal, thereby periodically searching for a CDMA signal during the connection to the CDMA network. However, if the dual mode mobile terminal does not search the CDMA signal during the connection to the CDMA network, the dual mode mobile terminal determines if the CDMA signal is found within a predetermined time while driving a timer. If the CDMA signal has been found within the predetermined time, the dual mode mobile terminal maintains the connection to the CDMA network.

If the dual mode mobile terminal maintains the connection to the CDMA network, the dual mode mobile terminal maintains a CDMA waiting mode in step 300. In this state, the dual mode mobile terminal determines a current position based on system parameters received from the CDMA base station in step 310. In step 320, the dual mode mobile terminal determines if the current position is in the WCDMA superposition area. If the current position is in the WCDMA superposition area as the determined result, the dual mode mobile terminal powers on the WCDMA modem after a predetermined time (e.g., T seconds) determined by the system in step 330. Then, the dual mode mobile terminal measures the intensity of the received signal by the WCDMA modem in step 340 and delivers a Received Signal Code Power (RSCP) (the correction value of the received signal) to the CDMA modem and the controller using a communication path connected between modems.

Then, the CDMA modem of the dual mode mobile terminal reads a value determined from the WCDMA modem during a predetermined time (i.e., N seconds) and determines if the intensity of the measured signal is at least a threshold value in step 350. If the measured signal intensity has at least a threshold value, the dual mode mobile terminal switches the current CDMA mode into the WCDMA waiting mode in step 360. In contrast, if the measured signal intensity has at most the threshold value, the dual mode mobile terminal stops the driving of the powered-on WCDMA modem (i.e., powers off the WCDMA modem) in step 370 and then maintains a current CDMA waiting mode in step 380. As described above, according to the present invention, when the dual mode mobile terminal in the CDMA mode goes into the WCDMA superposition area and attempts roaming toward the WCDMA network, if the WCDMA network is not found, the dual mode mobile terminal does not instantaneously perform system switching. In contrast, the dual mode mobile terminal according to the present invention performs stable roaming only when the intensity of a signal searching for the WCDMA network measured during a predetermined time has at least a predetermined value.

Thus, it is possible to reduce the occurrence of a roaming pin-pong phenomenon of repeatedly performing connection to one specific system in a congested roaming area of the WCDMA and the CDMA system. In addition, according to the present invention, a current mode is continuously maintained, and then the current mode is instantaneously switched into another mode after the completion of the roaming, thereby preventing the phenomenon of stopping a service according to the failure of the roaming in which the dual mode terminal continuously outputs for a predetermined time only an image showing a message that "A Mode Is Being Switched". Accordingly, it is possible to increase user convenience.

The following describes an operational procedure of performing roaming through a communication path connected between two modems to prevent a ping-pong phenomenon.

Figure 4A:
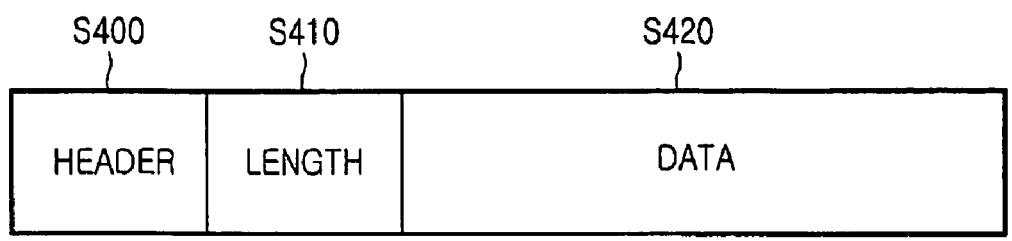
FIGS. 4A and 4B illustrate the formats of packets generally transmitted/received between a WCDMA modem and a CDMA modem according to an embodiment of the present invention.
Figure 4B:
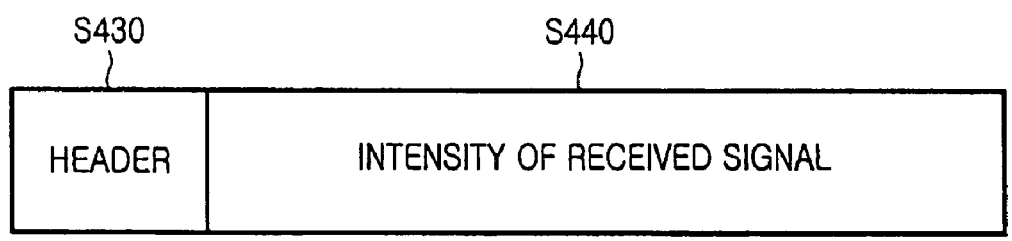

A protocol according to the present invention is defined in order to perform communication between two modems. For example, two modems deliver commands to each other using a packet having a format shown in FIGS. 4A and 4B. FIGS. 4A and 4B illustrate the format of a packet transmitted/received between the WCDMA modem and the CDMA modem according to an embodiment of the present invention.

'Header' S400 represents a type of a transmitted/received packet and has 1-byte size. The header S400 enables the distinction of a maximum of 255 messages. 'Length' S410 has 2-byte size at a maximum and represents a real size of data. 'Data' S420 denotes data according to the type of the packet and has a variable size restricted to 65535 bytes at a maximum. FIG. 4A illustrates the format of a packet generally transmitted/received between the WCDMA modem and the CDMA modem. FIG. 4B illustrates the format of a packet including the intensity of a received signal delivered to a current modem from a target modem for roaming. For example, if the CDMA modem requests that the WCDMA modem measures the intensity of the received signal using the packet format shown in FIG. 4A, the WCDMA modem delivers a response message including a header and the intensity of a received signal by using the packet format shown in FIG. 4B in response to the request.

A message header transmitted/received between the WCDMA modem and the CDMA modem for obtaining the intensity of the received signal measured by the WCDMA modem is expressed as shown in Tables 1 and 2.

TABLE 1 typedef enum
{
HM_SIO_INTERCHIP_FROM_W_TO_1X_PKT_NONE =0,
HM_SIO_INTERCHIP_FROM_W_TO_1X_INF_CHIP_ON,
HM_SIO_INTERCHIP_FROM_W_TO_1X_RSP_RSCP_CHECK,
HM_SIO_INTERCHIP_FROM_WO_TO_1X_PKT_MAX
}hm_sio_interchip_from_w_to_1x_pkt_type;

TABLE 2 typedef enum
{
HM_SIO_INTERCHIP_FROM_1X_TO_W_PKT_NONE =0,
HM_SIO_INTERCHIP_FROM_1X_TO_W_ACK_CHIP_ON,
HM_SIO_INTERCHIP_FROM_1X_TO_W_CMD_RSCP_CHECK,
HM_SIO_INTERCHIP_FROM_1X_TO_W_PKT_MAX,
}hm_sio_interchip_from_1x_to_w_pkt_type;

Table 1 shows the contents of a packet header for delivering information to the CDMA modem from the WCDMA modem, and Table 2 shows the contents of a packet header for delivering information to the WCDMA modem from the CDMA modem.

According to one embodiment of the present invention, 4 types of messages transmitted/received between different modems using the packets may be defined. For example, the INF message is an abbreviation of 'Inform' for informing another modem of a chip state of a modem generating the INF message. The ACK message is an abbreviation of 'Acknowledge' and is a response message for the INF message. The CMD message is an abbreviation of 'Command' and denotes a command message delivered to another modem chip from one modem chip, and the RSP is an abbreviation of 'Response' and transmits a result for the command message.

Figure 5:
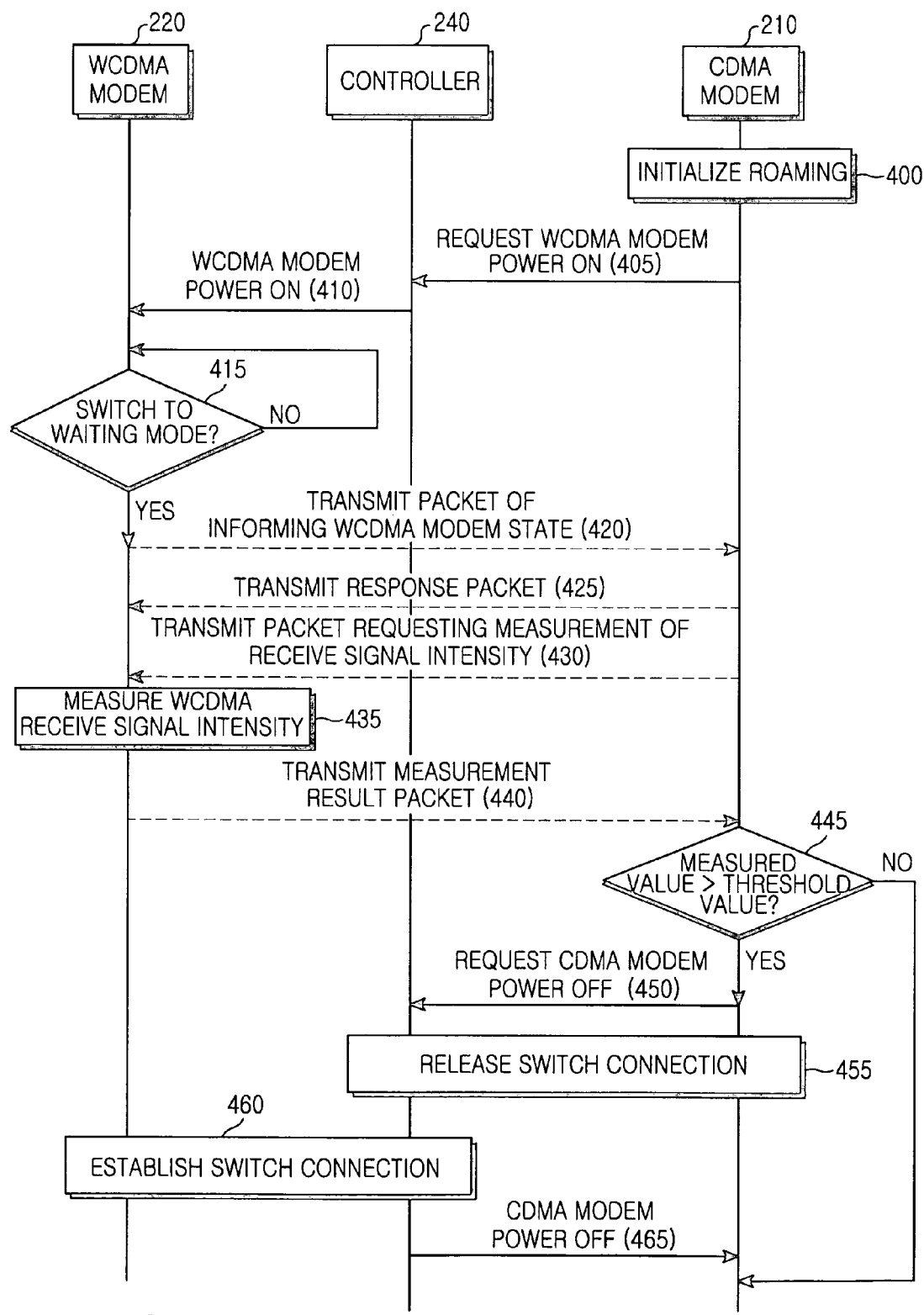
FIG. 5 is a flowchart illustrating a procedure of transmitting/receiving a message between two modems, different from each other, according to an embodiment of the present invention.

Hereinafter, a procedure of transmitting/receiving a message for preventing the stoppage of services due to a ping-pong phenomenon in a WCDMA weak electric field through a communication path according to the present invention using the above described definition will be described with reference to FIG. 5. FIG. 5 is a flowchart illustrating a procedure for transmitting/receiving a message between two modems different from each other according to an embodiment of the present invention.

In the roaming procedure according to the present invention, after a target modem for roaming performed through a communication path formed between modem chips is powered on at a roaming request time point, it is determined whether roaming conditions are satisfied based on the intensity of a received signal measured by the target modem. The roaming is performed only when the roaming conditions are stably satisfied. The roaming condition requires that, an electric field strength of a searched signal based on the intensity of the received signal measured by the target modem must be at least a threshold value, and the electric field strength having at least the threshold value must be measured during a predetermined period of time.

In detail, in the procedure of performing roaming between the WCDMA and the CDMA, if it is determined according to a predetermined condition that a dual mode mobile terminal operating in the CDMA waiting mode goes into a WCDMA superposition area, the dual mode mobile terminal performs roaming initialization required for commencing roaming in step 400. Herein, the dual mode mobile terminal determines based on system parameters received from a CDMA base station that the dual mode mobile terminal is currently positioned at the WCDMA superposition area.

If the roaming is commenced as described above, the CDMA modem 220 delivers to the controller 240 a request that the controller 240 powers on the WCDMA modem 210 after a predetermined time interval (i.e., T seconds) in step 405. In response to the request, the controller 240 orders the WCDMA modem 220 to power on the WCDMA module in step 410. According to the order, the WCDMA modem 220 is powered on, registered in a system before roaming preparation is finished, and then goes into a waiting mode, thereby completing the roaming preparation. Accordingly, the WCDMA modem 220 determines if its state has been switched to the waiting mode after it is powered on as shown in step 415.

If the WCDMA modem 220 has been switched to the waiting mode, the WCDMA modem 220 transmits a packet message for informing the CDMA modem of the state of the WCDMA modem 220 through a communication path in step 420. The information is delivered through 'HM_SIO_INTERCHIP_FROM_TO_1X_INF_CHIP_ON' which is the INF message, and the INF message informs the completion of the roaming preparation. Then, the CDMA modem 210 delivers an ACK message, 'HM_SIO_INTERCHIP_FROM_1X_TO_W_ACK_CHIP_ON' representing the acknowledgement of the INF message to the WCDMA modem 220 in step 425. Simultaneously, the CDMA modem 210 may inform the controller 240 of the fact that the WCDMA modem 220 completes the roaming preparation (not shown).

Then, the CDMA modem 210 directly delivers a packet message for requesting the measurement of the intensity of the received signal to the WCDMA modem 220 through a communication path in step 430. In response to the request, the WCDMA modem 220 measures the intensity of the searched signal by searching the WCDMA network in step 435. WCDMA modem 220 then delivers a packet through the communication path in step 440 as shown in FIG. 4b representing the measurement value to the CDMA modem 210 which had requested the measurement. In detail, the packet including the measurement value has an RSCP of the searched signal (a correction value of the intensity of the received signal). Thereafter, the CDMA modem 210 determines in step 445 if the measurement value is more than a predetermined value. Herein, the CDMA modem 210 repeatedly reads the measurement value from the WCDMA modem 220 during a predetermined time interval (i.e., N seconds). Accordingly, the CDMA modem 210 repeatedly performs the comparison of the measurement value and the threshold value during a predetermined time interval in such a manner that the dual mode mobile terminal may maintain the connection to a current network or establish the connection to another network.

If the measurement value delivered from the WCDMA modem 220 is continuously more than a threshold value during N seconds, the CDMA modem 210 delivers a power-off request message for the CDMA modem to the controller 240 in order to be switched to the WCDMA modem. Then, the controller 240 releases the switch connection with the CDMA modem 210 in step 455 and establishes the switch connection with the WCDMA modem 220 in step 460. Then, the controller 240 powers off the CDMA modem 210 in step 465.

As described above, according to the present invention, although the dual mode mobile terminal is positioned at an area having a roaming ping-pong phenomenon, the dual mode mobile terminal switches its state into the WCDMA mode if the dual mode mobile terminal determines that the WCDMA signal is not part of a weak electric field based on a searched signal measured from a target modem for roaming during a predetermined time interval. In contrast, if it is determined that the WCDMA signal is part of a weak electric field, the dual mode mobile terminal maintains a current CDMA mode as it is and then attempts roaming toward the WCDMA after a predetermined time interval. Thus, it is possible to reduce the occurrence of a roaming ping-pong phenomenon in which connection to a specific system is repeatedly performed in an overlap area between the WCDMA and the CDMA.

As described above, according to the present invention, it is possible to prevent a ping-pong phenomenon in which a service is not available during 1 to 2 minutes when the attempted roaming toward the WCDMA from the CDMA fails in a WCDMA weak electric field. In addition, if a mode switch is achieved through roaming and then fails, a current mode is continuously maintained according to the intensity of a received signal in a target place for roaming without returning to an original mode or is switched into another mode, thereby improving user convenience for roaming.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for performing roaming in a dual mode mobile terminal such that a ping-pong phenomenon is prevented, the dual mode mobile terminal including a first modem and a second modem capable of providing a service through different mobile communication schemes, the method comprising:

determining if a current position of the dual mode mobile terminal is within a service superposition area based on information received from a first communication network;

turning on power of the second modem after a predetermined time interval through a communication path connected between the modems if the current position is within the service superposition area;

determining if the current position is within a shadow area of a second communication network by measuring intensity of a signal received from the second modem during a preset time interval through the communication path; and maintaining a current mode if the current position is within the shadow area of the second communication network based on the determination result.

2. The method as claimed in claim 1, further comprising performing mode switching into the second communication network if the current position is not within the shadow area of the second communication network based on the determination result.

3. The method as claimed in claim 1, wherein the first communication network and the second communication network correspond to a Code Division Multiple Access (CDMA) network and a Wideband Code Division Multiple Access (WCDMA) network, respectively, and the first modem and the second modem process signals transmitted/received through the CDMA network and the WCDMA network, respectively.

4. The method as claimed in claim 1, wherein turning on power of the second modem includes delivering a power-on request packet to the second modem from the first modem.

5. The method as claimed in claim 4, wherein the power-on request packet includes a header field representing a type of a transmitted/received packet, a length field representing a real size of data, and a data field representing data according to a packet.

6. The method as claimed in claim 1, wherein determining if the current position is within the shadow area of the second communication network includes:

measuring by the second modem, the intensity of a signal received from the second communication network;

reading by the first modem, a receive signal code power (RSCP) which is a correction value of the measured intensity of the received signal from the second modem through a communication path during a predetermined time interval;

determining if the read intensity of the received signal is more than a threshold value; and determining the current position to be within the shadow area of the second communication network if the read intensity is at least the threshold value based on the determination result.

7. The method as claimed in claim 1, further comprising turning off the power of the second modem if the current position is within the shadow area of the second communication based on the determination result.

8. The method as claimed in claim 1, wherein information received from the first communication network includes a system parameter.

* * * * *